UNITED STATES PATENT OFFICE.

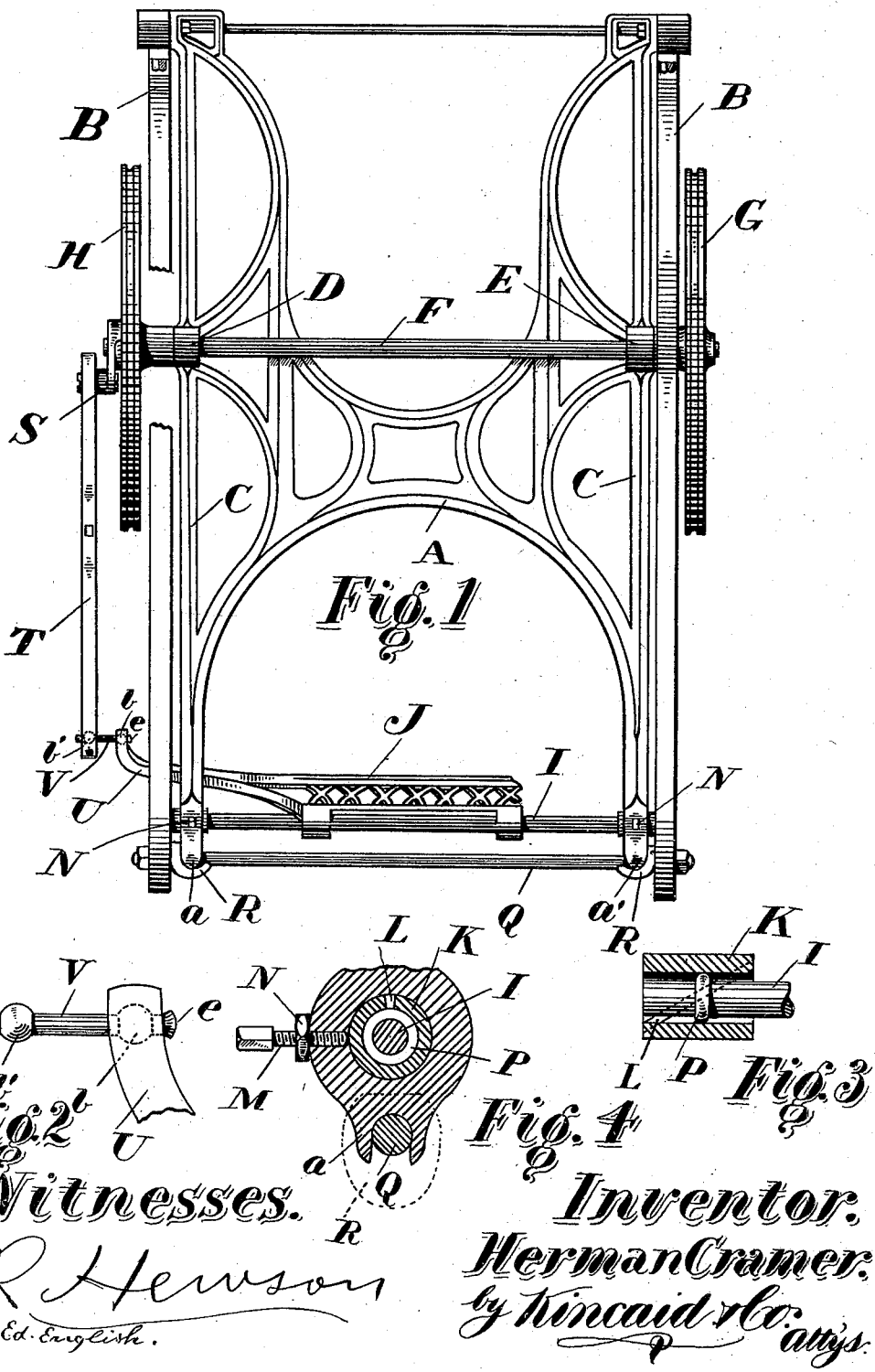

HERMAN CRAMER, OF SONORA, CALIFORNIA.

TREADLE FOR SEWING-MACHINES.

SPECIFICATION forming part of Letters Patent No. 627,101, dated June 20, 1899.

Application filed December 13, 1895. Serial No. 572,088. (No model.)

*To all whom it may concern:*

Be it known that I, HERMAN CRAMER, a citizen of the United States, residing at Sonora, in the county of Tuolumne and State of California, have invented certain new and useful Improvements in Sewing-Machines; and I do hereby declare the following to be a full, clear, and exact description of the invention, such as will enable others skilled in the art to which it appertains to make and use the same.

This invention relates to improvements in sewing-machines, and more particularly to the driving mechanism of sewing-machines; and its prime objects are, first, to provide for maximum uniformity of motion by so assembling and distributing the weights of the various moving parts that their pressure on the bearings is at right angles to their axis of revolution; second, to minimize friction and lessen the vibration resulting from the motion of the parts, and thereby materially decrease the amount of labor required to operate the machine; third, to provide for a maximum distance between the bearings at opposite extremities of each shaft or moving rod, thereby increasing the uniformity of motion and lessening any tendency to the shifting of the axis of revolution of the shaft or rod and consequent binding in its journal; fourth, to so design the double vertical brace that the principal moving parts of the operating mechanism may be journaled therein, thereby assembling the bearings independent of the legs of the machine and in a rigid structure free from any liability of spreading or other derangement, and, fifth, to position the bearings of the treadle-bar as far as possible from the treadle, thereby guarding against the lodgment of dirt and dust from the operator's feet.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, in which—

Figure 1 is a front elevation of that portion of a sewing-machine to which my invention appertains. Fig. 2 is an elevation of the connection between the pitman and treadle. Fig. 3 is a longitudinal section of the adjustable bearing employed; and Fig. 4 is a transverse vertical section through the lower extremity of the vertical brace, showing the relative position of the treadle-bearing.

Like letters of reference indicate like parts throughout the several views.

Referring now to the details of the drawings by letter, A designates what is termed in this class of devices the "vertical brace," which in relation to the legs B has been a necessary element to the proper bracing and stiffening of the machine-frame which supports the table-top; but besides performing these functions in my present invention I have provided for others of equal importance that will be hereinafter specified. The only addition to the general form of vertical braces now employed consists of the vertical members C, which are cast in integral with the remainder of the brace and unite with the upper and lower extremities of its branches and brought as near the legs B as possible and parallel with them; but this relative position of the members C, although of advantage, is not a necessary element to the proper operation of the invention, as other members may be cast on the vertical brace to bring the bearings in the same position relative to the legs of the machine.

Extending horizontally across the brace A and having bearings in the members C at D and E is the shaft F, which projects beyond both legs B and carries at its extremities the balance and band wheels G and H, respectively.

The lower portion or extremities of the vertical brace A is so formed as to support the treadle-bar I, which is secured to the treadle J, and to reduce the friction between the movable and stationary parts of the machine I have provided the special bearing shown in Figs. 3 and 4, which consists of the outer box or ring K being formed with a diagonal open slot L, which enables it being set up or adjusted about the moving member by means of a set-screw M and binding-nut N, the screw being also adapted to retain the box K in the desired position in the vertical brace. The shaft or bar to revolve in this box K is formed with a swelled curved flange P, which affords the contact-surface with the box.

The lower extremities of the branches of the vertical brace are fork-shaped at $a\ a'$ and rest over the cross-bar Q, which, bolted to the lower extremities of the legs B and in conjunction with the intermediate drip-cups R, binds the legs B and brace A firmly together to form a rigid structure.

A crank-arm S is secured to the band wheel or shaft in the usual manner and a split pitman T suspended therefrom; but the connection between this pitman T and the treadle-arm U forms one of the novel features of my invention. It consists of a short bar V, made of malleable iron and formed with the spherical enlargements $b\ b'$, the latter being adapted to engage with an adjustable recess in the lower extremity of the pitman T, while the former is held securely in the arm U by casting the latter, which is of cast-iron, around it. By this method the rigidity and strength of the connection are materially increased; but should, however, the bar V work loose in the arm U the projecting extremity $e$ can be readily riveted to bind the parts. The pitman can be either positioned to the right or left or both sides of the treadle, as desired.

It will be readily seen from Fig. 1 that a maximum distance between bearings is provided, and the band and balance wheels are so situated on their shaft as to produce a pressure on the bearings exactly at right angles to its axis of revolution, thereby producing a balanced and steady motion, a guard against any liability to misstitch, and a uniform wear on the bearings; and, further, the legs of the machine, being interposed between the wheels, afford, in addition to their usual function, a most efficient dress-guard. It is further manifest that the legs, being essentially independent of the vertical brace and the bearings of the moving parts, any shifting or disarrangements that might occur in their position will not and cannot affect in the slightest degree the operation or hanging of the parts. In fact, the legs may be entirely removed or detached from the vertical brace without deranging or rendering inoperative the treadle and driving-gear.

Although the extra balance-wheel is essential to the perfect balancing of the shaft and driving-gear, still with the preservation of the maximum distance between the bearings such as I have provided this balance-wheel may be dispensed with without material hindrance to the operation of the parts; but I am aware that this and other changes, such as the substitution of other forms of bearings for those shown and a change in the form and proportion and position of some of the parts, can be made in the invention without departing from its spirit or sacrificing its vital advantages, and I therefore reserve the right to make such changes and alterations as fairly fall within the scope of my invention.

Having thus fully described my invention, what I claim, and desire to secure by Letters Patent, is—

The combination with the band-wheel and pitman of a sewing-machine, of a treadle provided with a projecting arm for engagement with said pitman, said treadle being formed of a material different from that composing said arm and cast about it to form a rigid structure, said arm being formed at each extremity with an enlargement and projecting entirely through said treadle.

In witness whereof I hereunto set my hand in presence of two witnesses.

HERMAN CRAMER.

Witnesses:
F. P. OTIS,
R. NICHOLAS.